(12) United States Patent
Jia

(10) Patent No.: US 12,411,662 B2
(45) Date of Patent: Sep. 9, 2025

(54) DIGITAL ASSISTANT CREATION

(71) Applicant: Beijing Zitiao Network Technology Co., Ltd., Beijing (CN)

(72) Inventor: Xuewei Jia, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/635,437

(22) Filed: Apr. 15, 2024

(65) Prior Publication Data

US 2025/0139404 A1     May 1, 2025

(30) Foreign Application Priority Data

Oct. 27, 2023    (CN) .......................... 202311415879.1

(51) Int. Cl.
    *G06F 8/30*         (2018.01)
    *G06N 20/00*      (2019.01)

(52) U.S. Cl.
    CPC ............... *G06F 8/30* (2013.01); *G06N 20/00* (2019.01)

(58) Field of Classification Search
    CPC ...................................................... G06N 3/006
    See application file for complete search history.

(56) References Cited

U.S. PATENT DOCUMENTS

| 10,608,966 | B1 * | 3/2020 | Landowski | ............. H04L 51/02 |
| 2014/0359439 | A1 | 12/2014 | Lyren | |
| 2017/0357638 | A1 | 12/2017 | Schlesinger et al. | |
| 2018/0052824 | A1 * | 2/2018 | Ferrydiansyah | ....... G06N 20/00 |
| 2020/0387550 | A1 * | 12/2020 | Cappetta | ............. G06F 16/9538 |
| 2021/0089860 | A1 * | 3/2021 | Heere | ..................... G06N 20/00 |
| 2021/0104317 | A1 * | 4/2021 | Warner | ............... G06F 9/44526 |
| 2022/0103491 | A1 * | 3/2022 | Yang | ....................... G06F 40/35 |

(Continued)

FOREIGN PATENT DOCUMENTS

| CN | 110149806 A | * | 8/2019 | ........... G06F 16/903 |
| CN | 110569352 | | 12/2019 | |

(Continued)

OTHER PUBLICATIONS

International Search Report in International Appln. No. PCT/CN2024/087634, mailed on Jun. 24, 2024, 5 pages (with English translation).

(Continued)

*Primary Examiner* — Qing Chen
(74) *Attorney, Agent, or Firm* — Fish & Richardson P.C.

(57) ABSTRACT

Embodiments of the disclosure provides technologies for digital assistant creation. A method includes: in response to receiving a creation request, presenting a page for creating a digital assistant, the page comprising at least one configuration area for receiving configuration information for the digital assistant, the at least one configuration area comprising: a first configuration area for receiving settings information input in a natural language; and in response to receiving a release request, releasing the digital assistant based on the configuration information, for use in interaction with the user. Therefore, by providing a modular, simple-input scheme for digital assistant creation, users are able to define digital assistants easily and quickly with different capabilities without requiring code writing capabilities.

18 Claims, 8 Drawing Sheets

(56) References Cited

U.S. PATENT DOCUMENTS

| | | | | |
|---|---|---|---|---|
| 2022/0180857 A1* | 6/2022 | Aharoni | ............... | G06F 40/56 |
| 2022/0310083 A1* | 9/2022 | Mohanty | ............... | G06N 5/02 |
| 2023/0229865 A1* | 7/2023 | Dhotre | ............. | G06F 16/24522 |
| | | | | 704/9 |

FOREIGN PATENT DOCUMENTS

| | | | | | |
|---|---|---|---|---|---|
| CN | 110892385 A | * | 3/2020 | .......... | G06F 11/2294 |
| CN | 110930994 | | 3/2020 | | |
| CN | 110609683 | | 1/2022 | | |
| CN | 110785970 | | 8/2022 | | |
| CN | 115083416 A | * | 9/2022 | ............. | G06F 3/013 |
| CN | 109313665 | | 6/2023 | | |
| CN | 116740238 | | 9/2023 | | |
| CN | 116795968 | | 9/2023 | | |
| CN | 117492743 | | 2/2024 | | |
| KR | 20240000266 U | * | 2/2024 | | |
| WO | WO-2013048880 A1 | * | 4/2013 | ............. | B60K 35/00 |

OTHER PUBLICATIONS

Office Action in Chinese Appln. No. 202311415879.1, dated Aug. 19, 2024, 18 pages (with English translation).
Extended European Search Report in European Appln No. 24720402.7, dated Mar. 21, 2025, 10 pages.

\* cited by examiner

DIGITAL ASSISTANT CREATION

CROSS-REFERENCE TO RELATED APPLICATIONS

The present application claims priority to Chinese Patent Application No. 202311415879.1, filed on Oct. 27, 2023, and entitled "METHOD, APPARATUS, DEVICE AND STORAGE MEDIUM FOR DIGITAL ASSISTANT CREATION", the entirety of which is incorporated here by reference.

TECHNICAL FIELD

The example embodiments of the present disclosure relate generally to the field of computers, and, more particularly, to digital assistant creation.

BACKGROUND

Digital assistants are provided to assist users in various task processing needs in different applications and scenarios. Digital assistants usually have intelligent dialogue and task processing capabilities. In the process of the interaction with digital assistants, users input interactive messages, and digital assistants respond to user input to provide response messages. Typically, digital assistants can support user inputs providing questions in a natural language format, and perform tasks and provide responses based on the understanding of the natural language input and logical reasoning capability of the digital assistants. Digital assistant interaction has become a useful tool that people love and rely on due to their flexible and convenient characteristics.

SUMMARY

In a first aspect of the present disclosure, a method for digital assistant creation is provided. The method comprises: in response to receiving a creation request, presenting a page for creating a digital assistant, the page comprising at least one configuration area for receiving configuration information for the digital assistant, the at least one configuration area comprising: a first configuration area for receiving settings information input in a natural language, the settings information being used to generate a prompt input of a machine learning model, and a response of the digital assistant to a user being determined by the digital assistant based on an output of the model; obtaining the configuration information received in the page; and in response to receiving a release request, releasing the digital assistant based on the configuration information, for use in interaction with the user.

In a second aspect of the present disclosure, an apparatus for digital assistant creation is provided. The apparatus comprises: a page presenting module configured to, in response to receiving a creation request, present a page for creating a digital assistant, the page comprising at least one configuration area for receiving configuration information for the digital assistant, the at least one configuration area comprising: a first configuration area for receiving settings information input in a natural language, the settings information being used to generate a prompt input of a machine learning model, and a response of the digital assistant to a user being determined by the digital assistant based on an output of the model; an information obtaining module configured to obtain the configuration information received in the page; and an assistant releasing module configured to, in response to receiving a release request, release the digital assistant based on the configuration information, for use in interaction with the user.

In a third aspect of the present disclosure, an electronic device is provided. The device comprises: at least one processing unit; and at least one memory, the at least one memory being coupled to the at least one processing unit and storing instructions for execution by the at least one processing unit. The instructions, when executed by at least one processing unit, cause the electronic device to perform the method of the first aspect.

In the fourth aspect of the present disclosure, a computer-readable storage medium is provided. The medium stores a computer program which, when executed by a processor, causes the device to perform operations that implement the method of the first aspect.

It would be appreciated that the content described in the section is neither intended to identify the key features or essential features of the present disclosure, nor is it intended to limit the scope of the present disclosure. Other features of the present disclosure will be readily understood through the following description.

BRIEF DESCRIPTION OF THE DRAWINGS

The above and other features, advantages, and aspects of the various embodiments of the present disclosure will become more apparent in combination with the accompanying drawings and with reference to the following detailed description. In the drawings, the same or similar reference symbols refer to the same or similar elements, wherein.

DETAILED DESCRIPTION

Figure 1:
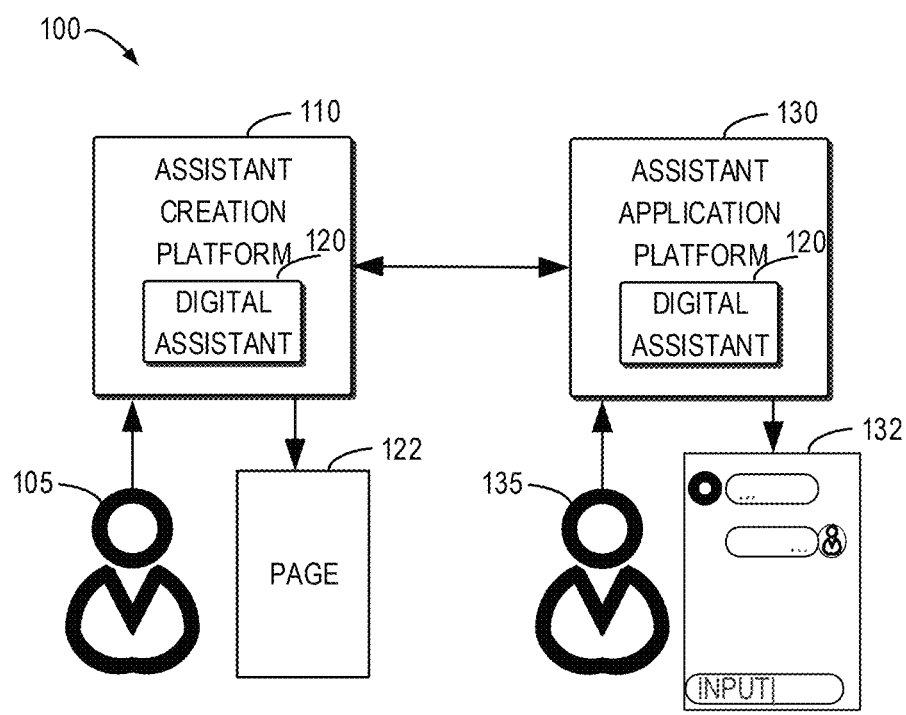
FIG. 1 shows a schematic diagram of an example environment.

The embodiments of the present disclosure will be described in more detail below with reference to the accompanying drawings. Although certain embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the accompanying drawings and embodiments of the present disclosure are only for the purpose of illustration and are not intended to limit the scope of protection of the present disclosure.

In the description of the embodiments of the present disclosure, the term "comprising", and similar terms would be appreciated as open inclusion, that is, "comprising but not limited to". The term "based on" would be appreciated as "at least partially based on". The term "one embodiment" or "the embodiment" would be appreciated as "at least one embodiment". The term "some embodiments" would be appreciated as "at least some embodiments". Other explicit and implicit definitions may also be included below.

Unless expressly stated herein, performing a step "in response to A" does not mean that the step is performed immediately after "A", but may comprise one or more intermediate steps.

It will be appreciated that the data involved in this technical solution (comprising but not limited to the data itself, data acquisition or use) shall comply with the requirements of corresponding laws, regulations, and relevant provisions.

It will be appreciated that before using the technical solution disclosed in each embodiment of the present disclosure, users should be informed of the type, the scope of use, the use scenario, etc. of the personal information involved in the present disclosure in an appropriate manner in accordance with relevant laws and regulations, wherein the relevant user may comprise any type of rights subject, such as individuals, enterprises, groups.

For example, in response to receiving an active request from a user, a prompt message is sent to the user to explicitly prompt the user that the operation requested operation by the user will need to obtain and use the user's personal information, so that users may select whether to provide personal information to the software or the hardware such as an electronic device, an application, a server or a storage medium that perform the operation of the technical solution of the present disclosure according to the prompt information.

As an optional but non-restrictive implementation, in response to receiving the user's active request, the method of sending prompt information to the user may be, for example, a pop-up window in which prompt information may be presented in text. In addition, pop-up windows may also contain selection controls for users to choose "agree" or "disagree" to provide personal information to electronic devices.

It will be appreciated that the above notification and acquisition of user authorization process are only schematic and do not limit the implementations of the present disclosure. Other methods that meet relevant laws and regulations may also be applied to the implementation of the present disclosure.

As used in this specification, the term "model" can learn a correlation between respective inputs and outputs from training data, so that a corresponding output can be generated for a given input after training is completed. The generation of the model can be based on machine learning techniques. Deep learning is a machine learning algorithm that processes inputs and provides corresponding outputs by using multiple layers of processing units. A neural networks model is an example of a deep learning-based model. As used herein, "model" may also be referred to as "machine learning model", "learning model", "machine learning network", or "learning network", and these terms are used interchangeably herein.

Digital assistants can serve as effective tools for people's work, study, and life. In general, the development of digital assistants is similar to the development of general applications, requiring developers having programming skills to define the various capabilities of digital assistants by writing complex code, and deploying digital assistants on appropriate operating platforms so that users can download, install, and use digital assistants.

With the diversification of application scenarios and the increasing availability of machine learning technology, digital assistants may be developed with different capabilities to support task processing in various segmented fields or meet the personalized needs of different users. However, limited by programming capabilities and limited understanding of the underlying implementation logic of digital assistants, users cannot freely and conveniently create different digital assistants. Therefore, this specification describes technologies configured to provide more convenient and flexible ways to create digital assistants, allowing more users to configure the wanted digital assistants.

According to embodiments of the present disclosure, an improved scheme for digital assistant creation is provided. According to this scheme, a page for creating a digital assistant is provided, which comprises one or more configuration areas for receiving configuration information for the digital assistant. In this page, a first configuration area is used for receiving settings information input in a natural language, the settings information is used to generate a prompt input of a machine learning model, and a response of the digital assistant to a user is determined by the digital assistant based on an output of the model. In this way, for users who require the creation of a digital assistant, settings information can be quickly input at least on this page to complete the creation process of the digital assistant. Afterwards, based on the configuration information received in the page, the digital assistant can be released for interaction with the user.

Therefore, by providing a modular, simple and free-input digital assistant creation scheme, users can easily and quickly define digital assistants with different capabilities without requiring user coding capabilities.

FIG. 1 shows a schematic diagram of an example environment 100 in which embodiments of the present disclosure can be implemented. The environment 100 involves an assistant creation platform 110 and an assistant application platform 130.

As shown in FIG. 1, the assistant creation platform 110 can provide a creation and release environment of a digital assistant for a user 105. In some embodiments, the assistant creation platform 110 can be a low-code platform that provides a collection of tools of digital assistant creation. The assistant creation platform 110 can support visual development for digital assistants, thereby allowing developers to skip the manual coding process and accelerate the development cycle and cost of applications. The assistant creation platform 110 can support any suitable platform for users to develop digital assistants and other types of applications, for example, it can comprise platforms based on application platform as a service (aPaaS). Such a platform can support users to efficiently develop applications, achieve application creation, application function adjustment, and other operations.

The assistant creation platform 110 can be deployed locally on the terminal device of the user 105 and/or can be supported by a remote server. For example, the terminal device of the user 105 can run a client (e.g., an application) in communication with the assistant creation platform 110, which can support the user's interaction with the assistant creation platform 110. In the case where the assistant creation platform 110 is run locally on the user's terminal device, the user 105 can directly use the client to interact with the local assistant creation platform 110. In the case where the assistant creation platform 110 is run on a server device, the server-side device can implement the provision of services to the client executing on the terminal device based on the communication connection between the assistant creation platform and the terminal device. The assistant creation platform 110 can present a corresponding page 122 to the user 105 based on the operation of the user 105 to output and/or receive information from the user 105.

In some embodiments, the assistant creation platform 110 may be associated with a corresponding database that stores data or information required for the process of digital assistant creation supported by the assistant creation platform 110. For example, the database may store code and descriptive information corresponding to various functional modules that make up the digital assistant. The assistant creation platform 110 may also perform operations such as invoking, adding, deleting, updating, etc. on the functional modules in the database. The database may also store operations that can be performed on different functional blocks. Exemplary, in a scenario where a digital assistant is to be created, the assistant creation platform 110 may invoke corresponding functional blocks from the database to construct the digital assistant.

In some embodiments of the present disclosure, the user 105 may create a digital assistant 120 on the assistant creation platform 110 as needed and release the digital assistant 120. The digital assistant 120 may be released to any suitable assistant application platform 130, as long as the assistant application platform 130 can support the execution of the digital assistant 120. After releasing, the digital assistant 120 may be used for conversational interaction with a user 135. The client of the assistant application platform 130 may present an interaction window 132 of the digital assistant 120 in the client interface, such as the conversation window. For example, the client may render a user interface in the terminal device for presenting the interaction window. The digital assistant 120, as an intelligent assistant, has intelligent conversation and information processing capabilities. The user 135 may enter a conversation message in the conversation window, and the digital assistant 120 may determine a reply message based on the created configuration information and present it to the user in the interaction window 132. In some embodiments, depending on the configuration of the digital assistant 120, the interaction message with the digital assistant 120 may comprise messages in various message formats, such as text messages (e.g., natural language text), voice messages, image messages, video messages, and so on.

The assistant creation platform 110 and/or the assistant application platform 130 may run on an appropriate electronic device. The electronic device may be any type of computing-capable device, comprising a terminal device or a server-side device. The terminal device may be any type of mobile terminal device, fixed terminal device, or portable terminal device, comprising mobile phones, desktop computers, laptop computers, notebook computers, netbook computers, tablet computers, media computers, multimedia tablets, personal communication system (PCS) devices, personal navigation devices, personal digital assistants (PDAs), audio/mobile player, digital cameras/video cameras, positioning devices, television receivers, radio broadcast receivers, e-book devices, gaming devices, or any combination thereof, comprising accessories and peripherals of these devices, or any combination thereof. Server-side devices may comprise, for example, computing systems/servers, such as mainframes, edge computing nodes, computing devices in cloud environments, and so on. In some embodiments, the assistant creation platform 110 and/or the assistant application platform 130 may be implemented based on cloud service.

It will be appreciated that the structure and function of the environment 100 are described for the purposes of illustration only, without implying any limitation on the scope of the present disclosure. For example, although FIG. 1 shows a single user interacting with the assistant creation platform 110 and a single user interacting with the assistant application platform 130, but multiple users can actually access the assistant creation platform 110 to create a digital assistant respectively, and each digital assistant can be used to interact with multiple users.

In the following, some example embodiments of the present disclosure will be described in detail with reference to the accompanying drawings. It should be understood that the pages shown in the drawings are merely examples and various page designs may actually exist. The various graphic elements in the page may have different arrangements and visual representations, one or more of which may be omitted or replaced, and one or more other elements may also exist.

The process of digital assistant creation described in this specification can be implemented on the assistant creation platform, with the terminal device installed on the assistant creation platform and/or the server corresponding to the assistant creation platform. In the following examples, for the sake of discussion, the assistant creation platform 110 is described from the perspective of the assistant creation platform, e.g. the assistant creation platform 110 shown in FIG. 1. The pages presented by the assistant creation platform 110 can be presented via the terminal device of the user 105, and user input can be received via the terminal device of the user 105. The user 105 who creates the digital assistant is sometimes referred to as an assistant creator, assistant developer, etc.

Figure 2:
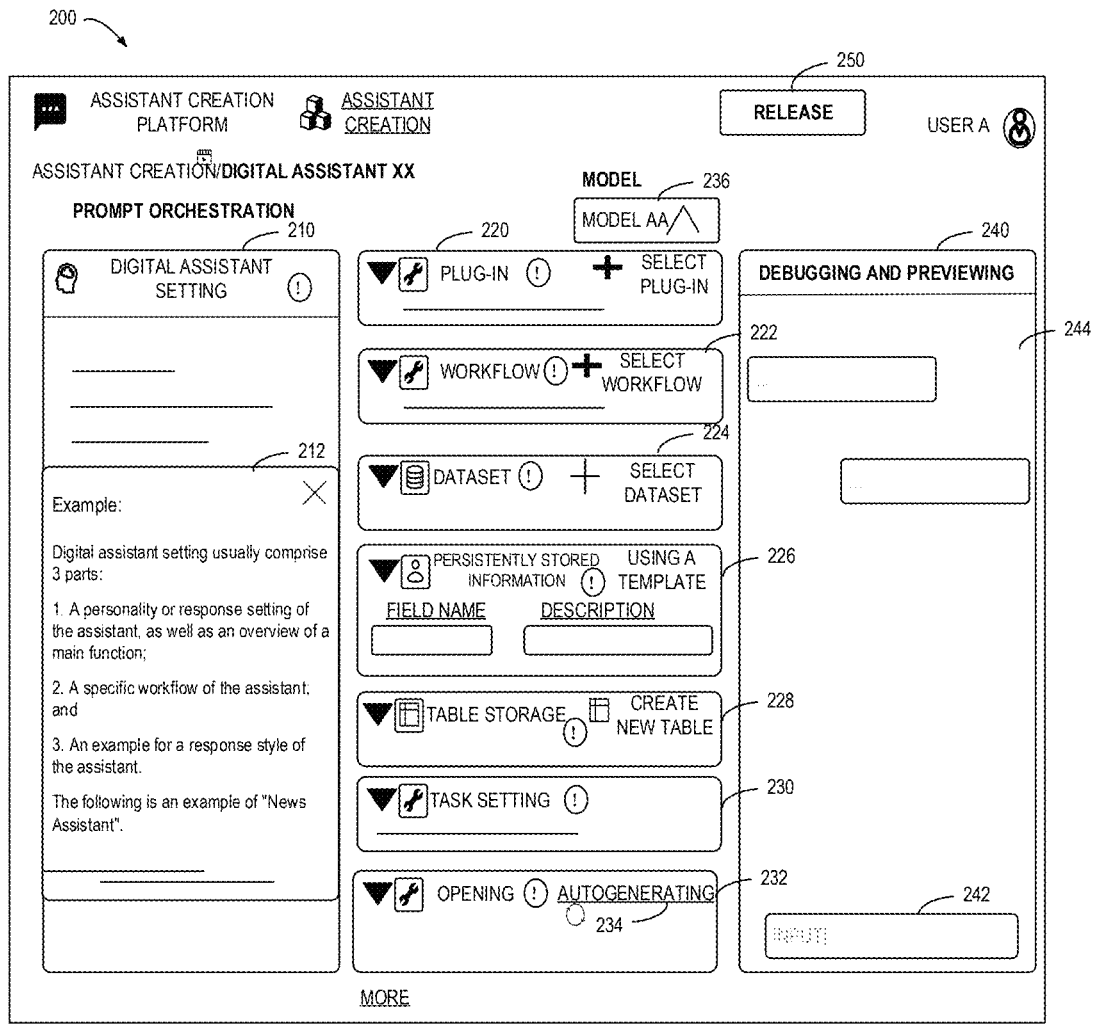
FIG. 2 shows an example of a page for creating a digital assistant.

The user 105 can initiate a creation request to the assistant creation platform 110 as needed. In response to receiving the creation request, the assistant creation platform 110 presents a page for creating a digital assistant. On this page, the user 105 can configure the digital assistant to be created (for example the digital assistant 120 shown in FIG. 1). Different from creating the digital assistant by writing code, in embodiments of the present disclosure, the page for creating a digital assistant is designed to comprise at least one configuration area for receiving configuration information for the digital assistant. Each configuration area is defined to receive a type of configuration information required for constructing the digital assistant. FIG. 2 shows an example of a page 200 for creating a digital assistant 120 in accordance with some embodiments of the present disclosure.

Specifically, the page comprises at least a first configuration area for receiving settings information input in a natural language. For example, the page 200 in FIG. 2 provides a configuration area 210, which comprises an input block for receiving settings information input by a user in a natural language.

The received settings information, as part of the configuration information of the digital assistant 120, will be used for generating a prompt input for a model, and a response of the digital assistant 120 to the user is determined by the digital assistant based on an output of the model. That is to say, the digital assistant 120 to be created will understand the user input with the assistance of the model and provide a response to the user based on the output of the model. The model used by the digital assistant 120 can run locally on the assistant creation platform 110 or on a remote server. In some embodiments, the model can be a machine learning model, a deep learning model, a learning model, neural networks, etc. In some embodiments, the model can be based on a language model (LM). The language model can have a question-answering capability by learning from a large corpus of data. The model can also be based on other appropriate models.

During the creation process, a specific configuration area is provided for users to provide settings information, and the configuration of settings information can be completed by the user based on a natural language input. This way, users can easily constrain the output of the model and configure diverse digital assistants.

In some embodiments, the page may further comprise a second configuration area for receiving a configuration of at least one processing component, the configuration of the processing component indicating at least one processing component that the digital assistant 120 is capable of using when processing a user request. In some embodiments, the configuration of the processing components, for the created digital assistant 120 and when interacting with a user, may be provided to the model. The model may determine which and/or what processing components need to be used to complete the processing of the user input, and thus determine a response for the user.

In some embodiments, in the page for creating a digital assistant, one or more processing components to be used can be pre-configured or recommended for the digital assistant to be created. For example, a creation entry for creating different types of digital assistants can be provided. For certain types of digital assistants, the processing components that digital assistants of that type usually need to use can be pre-configured or recommended. In this way, users do not even need to select processing components, but only need to input different settings information to obtain a customized digital assistant. The response style and format, certain workflows and functions of these digital assistants can be determined based on the settings information input by the user.

In the digital assistant, each processing component can be understood as a tool that the digital assistant 120 can invoke when processing user requests, and each processing component is able to perform corresponding functions or services. The types of processing components can be very diverse, and can be selected, configured, or modified by the user 105 from existing processing components, or can allow the user 105 to customize one or more processing components. As shown in FIG. 2, the configuration area in page 200 for receiving the configuration for at least one processing component comprises configuration areas 220, 222, 224, 226, 228, 230, 232, etc. The configuration of processing components will be described in more detail below.

By understanding user requests with the assistance of models and settings information, and performing the user requests with the assistance of processing components, the digital assistant 120 will be able to interact with users and respond to user requests. The page used to create a digital assistant can be templated to provide various configuration areas for receiving the configuration information of the digital assistant 120. The user 105 can complete a customization of the digital assistant 120 without performing complex configurations and coding.

Figure 3A:
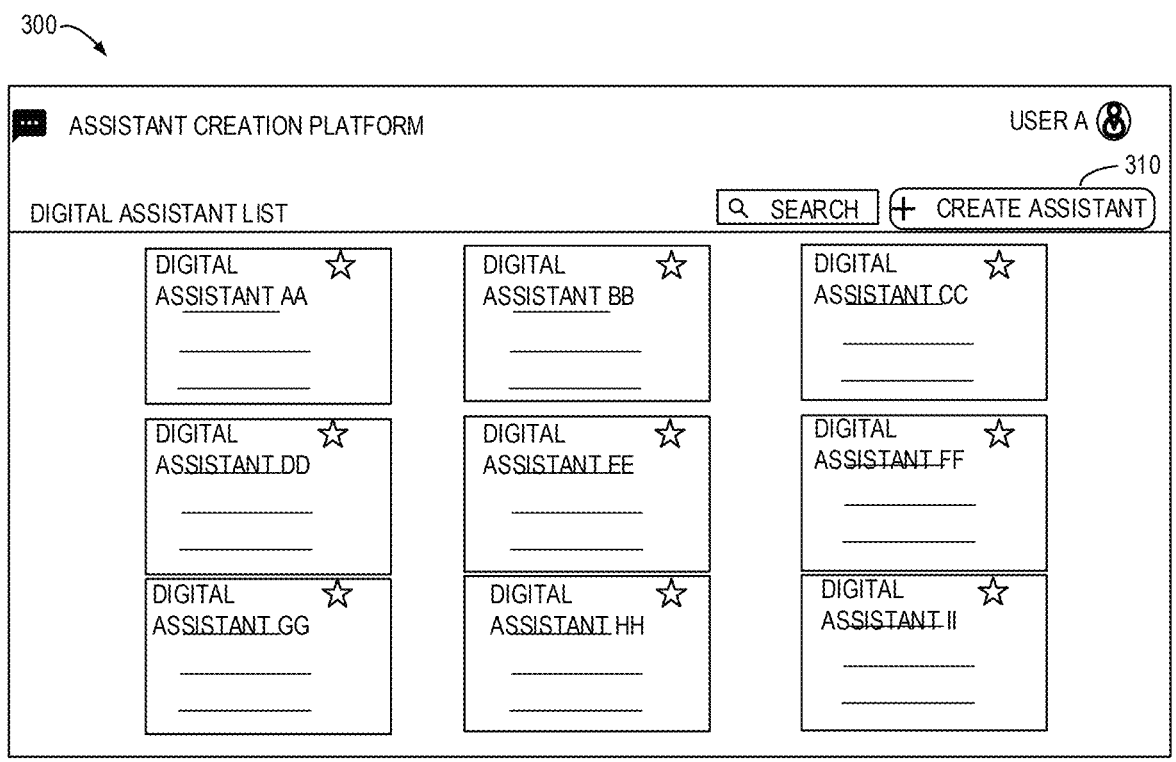
FIG. 3A shows an example of a page for triggering the creation of a digital assistant.

In some embodiments, the assistant creation platform 110 may provide a creation entry to the digital assistant in any suitable page. A user may access the page for creating a digital assistant by triggering the creation entry. FIG. 3A shows an example of a page 300 for triggering a creation of a digital assistant 120 in accordance with some embodiments of the present disclosure. The page 300 may be, for example, a home page of the assistant creation platform 110, which comprises a creation entry 310. Based on a trigger operation of the creation entry 310, the page 200 of FIG. 2 may be presented. FIG. 3A represents one specific example, and in fact, other creation entries may be set in the assistant creation platform 110.

Based on the input for creating a digital assistant of the user 105 in the page, configuration information received in the page can be obtained. The configuration information comprises at least the settings information received in the first configuration area. After completing the configuration, the user 105 is also allowed to release the created digital assistant. In response to receiving a release request, the assistant creation platform 110 releases the digital assistant 120 based on the configuration information received in the page for interaction with the user. As shown in FIG. 2, page 200 presents a release control 250. In response to detecting a trigger operation on the release control 250, the assistant creation platform 110 receives the release request of the user and releases the digital assistant 120 based on the configuration information received on page 200.

In some embodiments, the created digital assistant 120 may be released to run on a default platform. In some embodiments, a candidate platform may be provided for user selection. In response to receiving the release request, the assistant creation platform 110 may provide at least one candidate platform, each of the at least one candidate platform supporting the execution of the digital assistant 120. In response to receiving a determination of a target platform amongst the at least one candidate platform, the digital assistant 120 is released to the target platform, e.g. the assistant application platform 130 in FIG. 1.

In some embodiments, the settings information may indicate a definition of a response style of the digital assistant 120 to be created. By setting the response style, the responses of the created digital assistant can be differentiated and can exhibit a specific personality to the user. Alternatively, or in addition, in some embodiments, the settings information may indicate a description of a function supported by the digital assistant 120 to be created. For example, in the configuration area 210 of page 200, the user 105 may be allowed to input a text string, e.g., "You are a movie commentator, please use sharp and humorous language to explain the movie plot and introduce newly released movies to the user." Such settings information can guide the response style of the digital assistant 120 (e.g., "sharp humor") and describe the functions of the digital assistant 120 (e.g., "movie commentary", "explaining the movie plot", and/or "introducing newly released movies").

In some embodiments, alternatively or additionally, the settings information may indicate at least one workflow to be performed by the digital assistant 120 to be created. Each workflow may correspond to individual operations of the digital assistant 120 while performing a particular function. That is to say, the user 105 may be allowed to describe, in a natural language format, how the digital assistant 120 is to perform a certain function.

In some embodiments, alternatively or additionally, the settings information may indicate at least one response format of the digital assistant 120 to be created. The response format may comprise, for example, Markdown (a lightweight markup language) and the like.

It should be understood that the above only provides some examples of the settings information, and embodiments of the present disclosure are not limited in this regard. In fact, because the settings information will be used to construct prompt input for the model, users are allowed to freely try different settings information to construct a digital assistant that meets their expectations. For example, in the settings information, users can be allowed to input requirements for the response language of the digital assistant 120 and constraint conditions on the response content of the digital assistant 120 (e.g., the number of words for different types of responses, the type of response content, etc.).

In some embodiments, to better guide the user to complete the configuration of the digital assistant 120, a settings information example can also be provided in the page for guiding the user to provide settings information of the digital assistant 120. The settings information example can be provided at a location associated with the first configuration area for receiving the settings information. As shown in FIG. 2, a settings information example 212 can be provided near the configuration area 210, which can indicate a general communication of the settings information of the digital assistant 120 to the user and can provide specific settings information of a certain digital assistant as an example.

In some embodiments, one or more types of processing components may be provided to select or configure options, which allows the user 105 to select, enable, or specifically configure as needed.

Figure 3B:
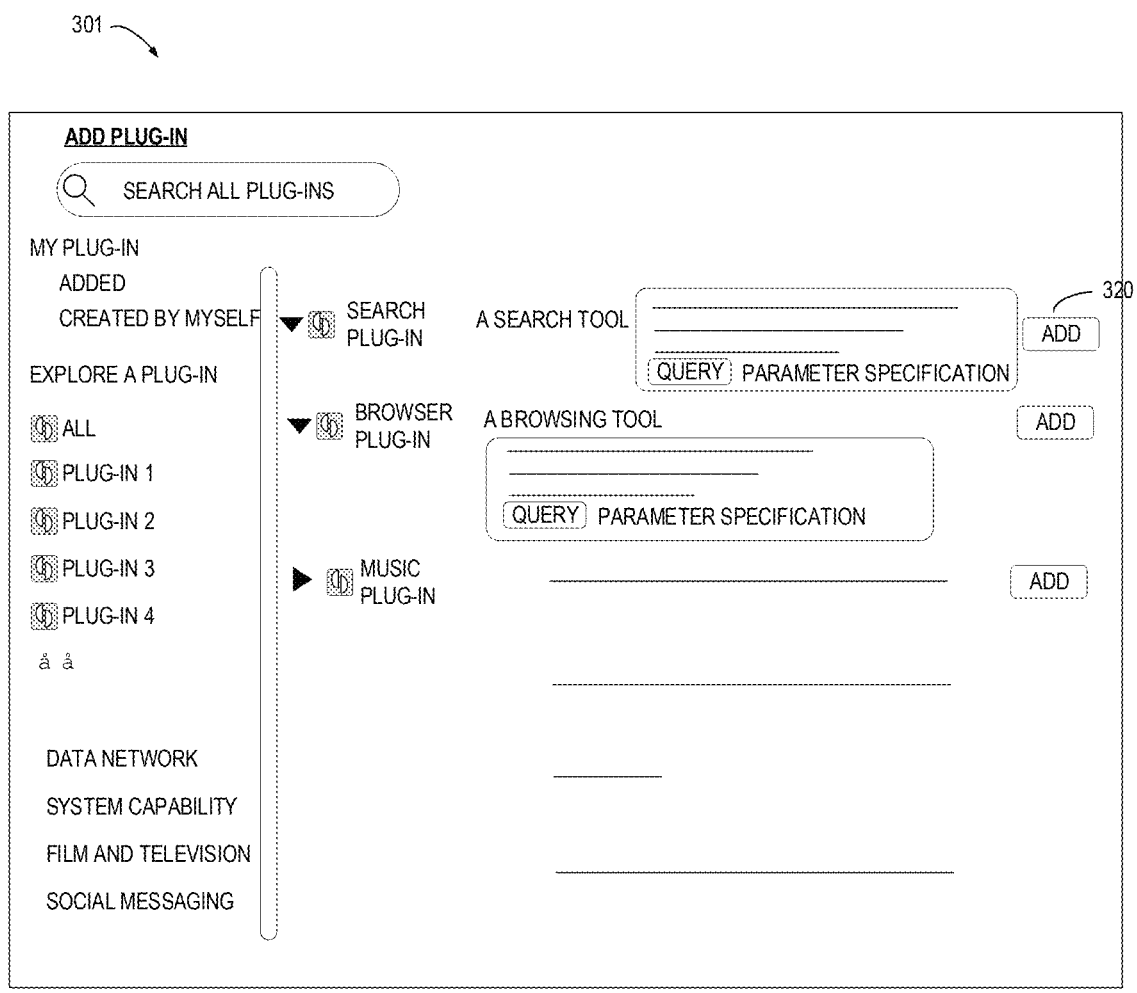
FIG. 3B shows a schematic diagram of an example interface for plug-in selection.

In some embodiments, the second configuration area may comprise an area for plug-in configuration, such as an area 220 shown in FIG. 2. At least one plug-in used by the digital assistant 120 can be selected or customized by the user in this area. Each plug-in is configured to perform a respective function. For example, a search plug-in can perform a data search function; a browser plug-in can provide a webpage browsing function; a music plug-in can provide a music search and a playing function, and so on. Each plug-in can be considered as an atomic capability of the digital assistant 110. The digital assistant 120 can invoke one or more plug-ins to process a user request. In some embodiments, the assistant creation platform 110 can provide a plug-in library from which the user 105 can select developed plug-ins. FIG. 3B shows an example interface 301 for plug-in selection according to some embodiments of the present disclosure, in which the user can browse the plug-in list and select the plug-in they want to use. As shown in FIG. 3B, an add control 320 for each plug-in can be provided to select the corresponding plug-in to be added to the digital assistant 120 by the user 105. In some embodiments, alternatively or additionally, the assistant creation platform 110 may provide a plug-in definition interface to define a plug-in having a specific function as required by the user 105.

In some embodiments, the second configuration area may comprise an area for workflow configuration, such as an area 222 shown in FIG. 2. In this area, the user can select or customize at least one workflow to be performed by the digital assistant 120. The workflow can not only be input in a natural language in the settings information, but the page 200 can also provide a workflow entry for the user 105 to select an existing workflow or define a workflow through a dedicated workflow design interface.

In some embodiments, the second configuration area may comprise an area for dataset configuration, such as an area 224 shown in FIG. 2. At least one dataset may be selected by the user in the dataset configuration area, and the digital assistant 120 uses at least one dataset to determine a response to the user. The "dataset" may also be referred to as a "knowledge base". In determining a response to the user, the digital assistant 120 may retrieve the respective knowledge from the configured dataset for the response determination. In some embodiments, the assistant creation platform 110 may allow the user 105 to configure the dataset of the digital assistant 120 by selecting from an existing dataset, uploading a local dataset, or specifying an online dataset, etc.

In some embodiments, the second configuration area may comprise areas for configuring persistently stored information, such as areas 226 and 228 shown in FIG. 2. Typically, during the interaction between the user and the digital assistant, due to reasons such as model input length, the digital assistant will extract limited contextual information from historical interactions to understand user input. However, for users interacting with the digital assistant, they may expect the digital assistant to maintain long-term memory of certain information, so as to continuously provide more targeted responses. If the digital assistant needs to repeatedly inquire about this information during the interaction with the digital assistant, it will cause a decrease in the user's experience. Therefore, in some embodiments of the present disclosure, the developer of the digital assistant is allowed to predefine at least one type of information that the digital assistant 120 needs to persistently store. With this configuration, the defined at least one type of information will be automatically extracted and stored for subsequent interactions during the interaction between the digital assistant 120 and the user. If the user updates a certain type of information during the interaction, the previously stored information will be overwritten or updated. The defined information will be persistently stored for the specific user interacting with the digital assistant 120. In this way, from the perspective of the interactive user of the digital assistant 120, the digital assistant 120 is able to remember or recall certain key information, thus providing a good interactive experience for the user.

In some embodiments, in area 226 of page 200, the user can configure one or more types of information to be stored in an attribute-value pair. For example, the creator of the digital assistant can add field names and descriptions of the information to be stored in area 226. In area 228 of page 200, the user can configure a table to persistently store one or more types of information. In the table, the creator can define more and more complex structured data. By defining the information to be persistently stored, after the created digital assistant 120 is released for interaction with user 135, the corresponding information entered by user 135 will be stored for a long time, e.g., beyond a current user interaction session with the digital assistant, and provided as interaction context to digital assistant 120 for subsequent interaction.

In some embodiments, the second configuration area may comprise an area for configuring tasks, such as area 230 shown in FIG. 2. The configuration of tasks can be supported by a task plug-in. In area 230, the user 105 may be allowed to configure the task plug-in to perform predetermined tasks or user-defined tasks. Through the configuration of the task plug-in, the digital assistant 120 can automatically execute predetermined tasks without specific triggering by interactive users or allow interactive users to create custom tasks as needed. In some embodiments, if the creator of the digital assistant has not made any configuration inputs in area 230 for configuring tasks, the task plug-in will not be included in the digital assistant 120.

In some embodiments, since different plug-ins can perform different functions, the execution results can be fed back to the user interacting with the digital assistant 120. To enrich the response style of the digital assistant 120, response configuration controls can also be provided for at least one plug-in selected by the creator. The creator of the digital assistant 120, i.e., the user 105, can trigger the response configuration control to configure the response style of each plug-in corresponding to the function.

Figure 3C:
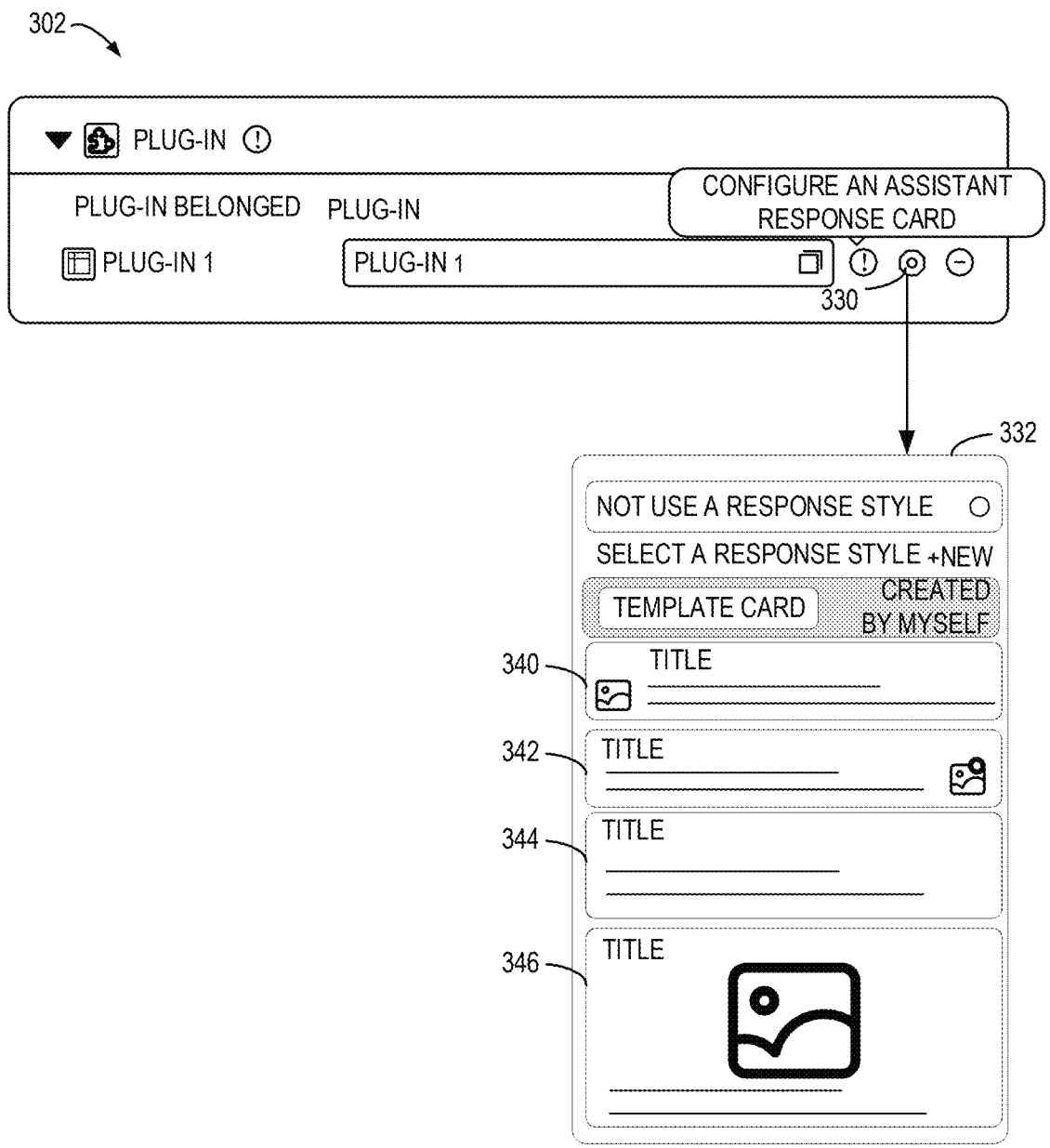
FIG. 3C shows a schematic diagram of an example interface for configuring a response style.

FIG. 3C shows an example interface 302 for configuring response styles according to some embodiments of the present disclosure. A response configuration control 330 is provided at a position associated with each plug-in. Specifically, in response to detecting a trigger operation of the response configuration control for the first plug-in in at least one plug-in, multiple candidate response styles associated with the first plug-in are presented. In the example shown, each candidate response style can indicate a graphical user interface (GUI) style for presentation in association with the message provided by the digital assistant 120. As shown in FIG. 3C, the trigger operation of the response configuration control 330 will select a response style selection window 332, which comprises multiple candidate response styles 340, 342, 344, 346. The user 105 can select the desired response style to use from these candidate response styles.

The user 105 who creates digital assistant 120 can select the target response style of the first plug-in from multiple candidate response styles. In this way, during the use of digital assistant 120, if the first plug-in is invoked to perform the corresponding function, the result of the execution will be provided to the interactive user in the target response style.

In some embodiments, the page for creating a digital assistant may further comprise a third configuration area for receiving guidance information. In the example page 200 of FIG. 2, an area 232 for receiving the guidance information is provided. The guidance information presented directly to the user 135 when the user 135 triggers interaction with the digital assistant 120. In some embodiments, the guidance information comprises at least one of: description information for the digital assistant 120 and at least one recommendation of a question for the digital assistant 120. The description information for the digital assistant 120 can provide the user 135 with a general understanding of the characteristics of the digital assistant 120, the functions that can be implemented, etc. The recommendation question for the digital assistant 120 can inspire the user 135 to initiate interaction with the digital assistant 120, or directly select the recommendation question to interact with the digital assistant 120.

In some embodiments, the guidance information may be automatically generated. The information generation control may be provided in the page, for example, at a position associated with the third configuration area. In the example of FIG. 2, an information generation control 234 may be provided near the area 232. Since the description information of the digital assistant 120 and/or at least one recommendation of a question for the digital assistant 120 may be derived from the settings information, in some embodiments, in the process of creating the digital assistant 120, in response to detecting a trigger operation of an information generation control associated with the third configuration area, candidate guidance information is generated based at least on the settings information received in the first configuration area. The candidate guidance information is presented in the third configuration area. In this way, the user 105 may determine whether to use the candidate guidance information, modify or replace the candidate guidance information, etc. as needed to obtain a final desired guidance information.

As described above, the digital assistant 120 can use a model to understand the user request and determine a response to the user. In some embodiments, the model used by the digital assistant 120 may be default and requires no configuration by the creator. In some embodiments, during the creation of the digital assistant 120, the creator may be allowed to select the model to be used. A fourth configuration area may be provided in the page used to create the digital assistant for receiving a selection of the model. The selected model is invoked to determine a response of the digital assistant 120 to a user. As shown in FIG. 2, the page 200 further comprises an area 236 for configuring the model, in which the user 105 may be allowed to select the model to be used.

The above discussed the configurable processing components in the process of digital assistant creation. In specific applications, the assistant creation platform can provide more, fewer, or different configurations of processing components as needed for the creator of the digital assistant to choose or configure.

In some embodiments, in order to enable the user 105 creating the digital assistant to easily test the execution effect of the created digital assistant 12 during the creation process, a debugging area for the digital assistant, such as a debugging area 240 shown in FIG. 2, may also be provided in the page. The debugging area 240 comprises an input area 242 for receiving a debugging request for the digital assistant 120, and a presentation area 244 for providing a debugging result for the debugging request (and providing the received debugging request). The debugging area 240 may be configured in the form of an interactive window, simulating an interactive interface viewed by an interactive user of the digital assistant 120.

During the debugging process, the debugging results presented in the debugging area 240 can be determined based on the received debugging request and current configuration information for the digital assistant 120 in the page 200. The user 105 can determine whether an actual execution result of the digital assistant 120 meets expectations based on the debugging result, determine whether to continue modifying the configuration information, or release the digital assistant. In some embodiments, for each debugging request, in addition to providing the debugging result, the digital assistant 120 may be provided to determine an underlying execution process of that debugging result, e.g., invocations of the model, the thought process of the model, one or more plug-in used, etc. This can allow the user 105 to more quickly determine whether the currently configured digital assistant meets expectations.

The above describes the process of creating a digital assistant in some embodiments of the present disclosure. In the embodiments of the present disclosure, the assistant creation platform provides sufficient support for the digital assistant constitution, so that users can easily, quickly, flexibly, and freely create the wanted digital assistant.

Figure 4:
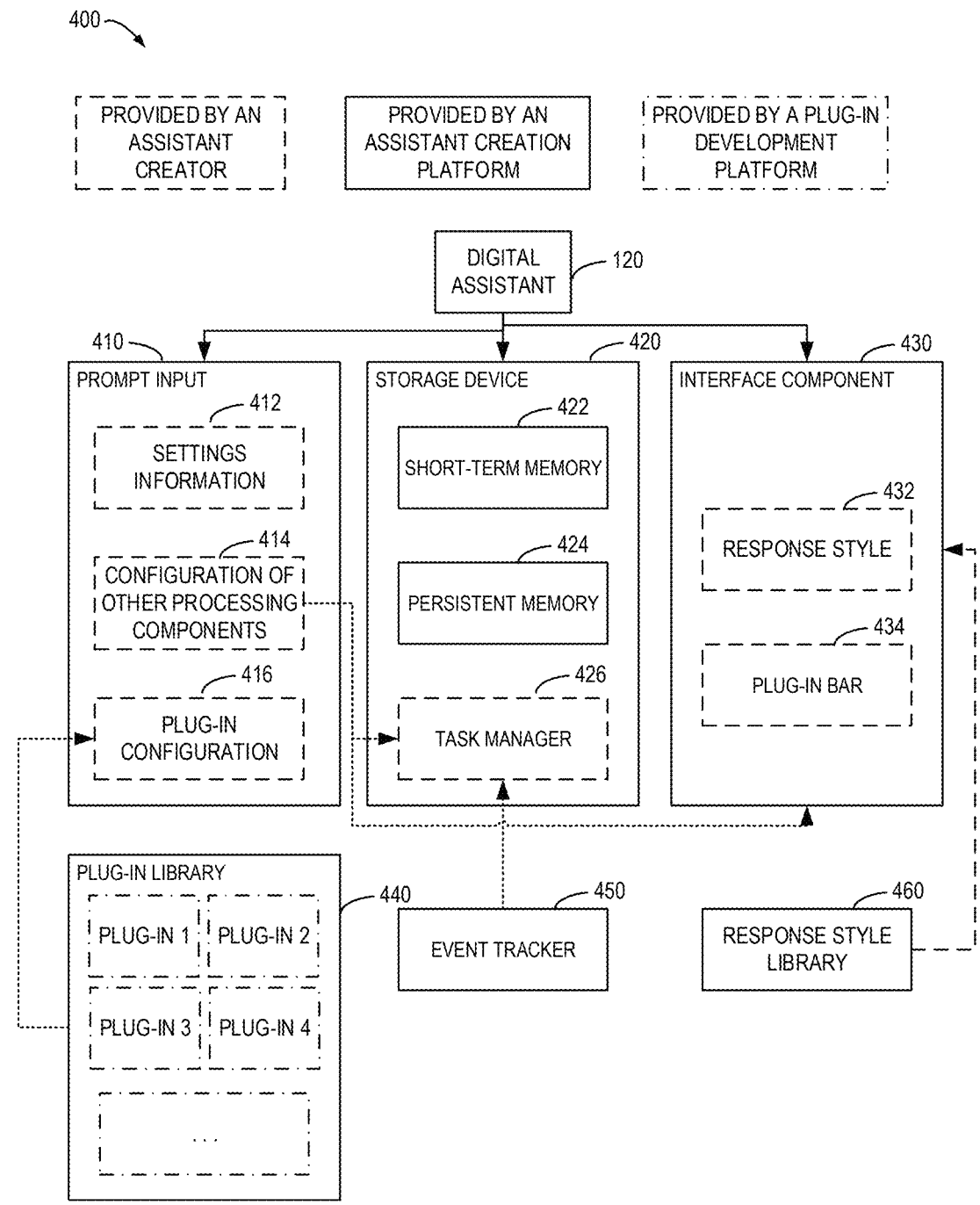
FIG. 4 shows an example of a composition of a digital assistant constructed.

FIG. 4 shows an example of a composition of the digital assistant 120 constructed in accordance with some embodiments of the present disclosure. After the creator completes the configuration via the assistant creation platform 110, the execution of the released digital assistant 120 is supported by the following three aspects: a prompt input 410, a storage device 420, and an interface component 430.

Settings information 412 input by the creator, a plug-in configuration 416 input by the creator, and/or a configuration of other processing components 414 can be used together to determine the prompt input 410, which will be provided to the model used by the digital assistant 120. The plug-in configuration 416 can be selected from a plug-in library 440 provided by a plug-in development platform by the creator or can be added to the plug-in library 440 after being developed by the creator.

The storage device 420 of the digital assistant 120 may comprise a short-term memory 422 for storing short-term contextual information during interaction with the user, and a persistent memory 424 for storing one or more types of information to be persistently stored, defined in the configuration information input by the creator. If the creator also configures a task plug-in, the storage device 420 further comprises a task manager 426 for managing a predetermined task or a user-defined task. The management of tasks can be completed by an event tracker 450 provided by the assistant creation platform 110.

The interface component 430 of the digital assistant 120 may indicate a response style 432 of the digital assistant 120, which may be selected by the creator from a response style library 460 provided by the assistant creation platform 110. In some embodiments, the interface component 430 of the digital assistant 120 may also be configured to comprise a plug-in bar 434 for presenting one or more plug-ins configured by the creator for the digital assistant 120.

In FIG. 4, providers of these components of the digital assistant 120 are shown by different blocks and lines, comprising the part provided by the assistant creator (e.g., the user 105), the part provided by the assistant creation platform 110, and the part provided by the plug-in development platform (i.e., the plug-in library and its plug-ins). From FIG. 4, it can be seen that only some configuration information needs to be input by the user to obtain customized development of the digital assistant 120.

Figure 5:
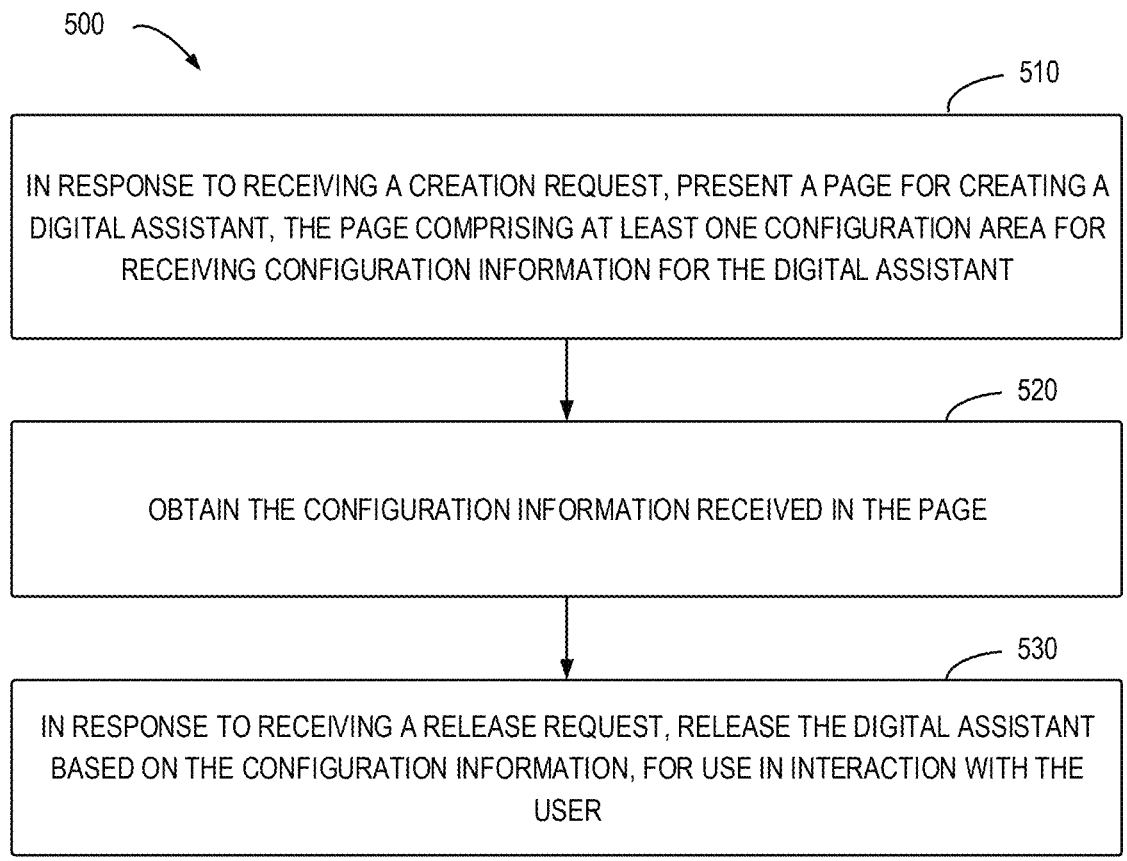
FIG. 5 shows a flowchart of an example process of application processing.

FIG. 5 shows a flowchart of an example process 500 for digital assistant creation in accordance with some embodiments of the present disclosure. The process 500 may be implemented at the assistant creation platform 110. The process 500 is described below with reference to FIG. 1.

At block 510, the assistant creation platform 110, in response to receiving the creation request, presents a page for creating a digital assistant, the page comprising at least one configuration area for receiving configuration information for the digital assistant. The at least one configuration area comprises: a first configuration area for receiving settings information input in a natural language, the settings information being used to generate a prompt input of a machine learning model, and a response of the digital assistant to a user being determined by the digital assistant based on an output of the model.

At block 520, the assistant creation platform 110 obtains the configuration information received in the page.

At block 530, in response to receiving a release request, the assistant creation platform 110 releases the digital assistant based on the configuration information, for use in interaction with the user.

In some embodiments, the at least one configuration area further comprises: a second configuration area for receiving a configuration of at least one processing component, the configuration of the at least one processing component being provided to the model for determining a response to the user.

In some embodiments, releasing the digital assistant comprises: in response to receiving the release request, providing at least one candidate platform, each of the at least one candidate platform supporting execution of the digital assistant; and in response to receiving a determination of a target platform amongst the at least one candidate platform, releasing the digital assistant to the target platform.

In some embodiments, the settings information indicates at least one of: a definition of a response style of the digital assistant, a description of a function supported by the digital assistant, at least one workflow to be performed by the digital assistant, or a definition of at least one response format of the digital assistant.

In some embodiments, the process 500 further comprises: providing a settings information example on the page for guiding a user in providing the settings information of the digital assistant.

In some embodiments, the at least one processing component comprises at least one of: at least one plug-in, each plug-in being configured to perform a corresponding function; at least one workflow to be performed by the digital assistant; at least one dataset which is to be utilized by the digital assistant to determine a response to the user; a definition of at least one type of information to be persistently stored, the at least one type of information being extracted during an interaction between the digital assistant and the user and being stored for a subsequent interaction; or a task plug-in configured to perform a predetermined task or a user-defined task.

In some embodiments, the process 500 further comprises: presenting a respective response configuration control for the at least one plug-in; in response to detecting a trigger operation of a response configuration control of a first plug-in amongst the at least one plug-in, presenting a plurality of candidate response styles associated with the first plug-in; and receiving a selection of a target response pattern amongst the plurality of candidate response styles.

In some embodiments, the at least one configuration area further comprises: a third configuration area for receiving guidance information, the guidance information being presented to a user in response to a detection of the user triggering an interaction with the digital assistant.

In some embodiments, the guidance information comprises at least one of: description information for the digital assistant, or at least one recommendation of a question for the digital assistant.

In some embodiments, the process 500 further comprises: in response to detecting a trigger operation of an information generation control associated with the third configuration area, generating candidate guidance information based at least on the settings information received in the first configuration area; and presenting the candidate guidance information in the third configuration area.

In some embodiments, the at least one configuration area further comprises: a fourth configuration area for receiving a selection of a model, the selected model being invoked to determine a response of the digital assistant to a user.

In some embodiments, the page further comprises: a debugging area for receiving a debugging request for the digital assistant and providing a debugging result for the debugging request, wherein the debugging result is determined based on the received debugging request and current configuration information for the digital assistant in the page.

Figure 6:
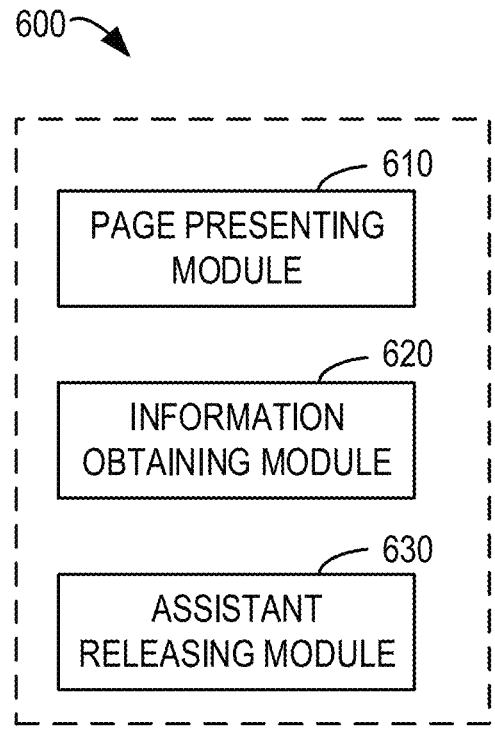
FIG. 6 shows a schematic block diagram of an example apparatus for application processing.

FIG. 6 shows a schematic block diagram of an example apparatus 600 for digital assistant creation in accordance with some embodiments of the disclosure. The apparatus 600, for example, may be implemented in or comprised in the assistant creation platform 110. The various modules/components in the apparatus 600 may be implemented by hardware, software, firmware, or any combination thereof.

As shown in the figure, the apparatus 600 comprises a page presenting module 610 configured to, in response to receiving a creation request, present a page for creating a digital assistant, the page comprising at least one configuration area for receiving configuration information for the digital assistant. The at least one configuration area comprises a first configuration area for receiving settings information input in a natural language, the settings information being used to generate a prompt input of a machine learning model, and a response of the digital assistant to a user being determined by the digital assistant based on an output of the model.

The apparatus 600 further comprises an information obtaining module 620 configured to obtain the configuration information received in the page. The apparatus 600 further comprises an assistant releasing module 630 configured to, in response to receiving a release request, release the digital assistant based on the configuration information, for use in interaction with the user.

In some embodiments, the at least one configuration area further comprises: a second configuration area for receiving a configuration of at least one processing component, the configuration of the at least one processing component being provided to the model for determining a response to the user.

In some embodiments, the assistant releasing module 630 comprises: a candidate platform providing module configured to, in response to receiving the release request, provide at least one candidate platform, each of the at least one candidate platform supporting execution of the digital assistant; and a target platform releasing module configured to, in response to receiving a determination of a target platform amongst the at least one candidate platform, release the digital assistant to the target platform.

In some embodiments, the settings information indicates at least one of: a definition of a response style of the digital assistant, a description of a function supported by the digital assistant, at least one workflow to be performed by the digital assistant, or a definition of at least one response format of the digital assistant.

In some embodiments, apparatus 600 further comprises: an example providing module configured to provide a settings information example on the page for guiding a user in providing the settings information of the digital assistant.

In some embodiments, the at least one processing component comprises at least one of: at least one plug-in, each plug-in being configured to perform a corresponding function; at least one workflow to be performed by the digital assistant; at least one dataset which is to be used by the digital assistant to determine a response to the user; a definition of at least one type of information to be persistently stored, the at least one type of information being extracted during an interaction between the digital assistant and the user and being stored for a subsequent interaction; or a task plug-in configured to perform a predetermined task or a user-defined task.

In some embodiments, the apparatus 600 further comprises: a control presentation module configured to present a respective response configuration control for the at least one plug-in; a response style module configured to, in response to detecting a trigger operation of a response configuration control of a first plug-in amongst the at least one plug-in, present a plurality of candidate response styles associated with the first plug-in; and a style selection module configured to receive a selection of a target response pattern amongst the plurality of candidate response styles.

In some embodiments, the at least one configuration area further comprises: a third configuration area for receiving guidance information, the guidance information being presented to a user in response to a detection of the user triggering an interaction with the digital assistant.

In some embodiments, the guidance information comprises at least one of: description information for the digital assistant, or at least one recommendation of a question for the digital assistant.

In some embodiments, the apparatus 600 further comprises: a candidate guidance generation module configured to, in response to detecting a trigger operation of an information generation control associated with the third configuration area, generate candidate guidance information based at least on the settings information received in the first configuration area; and a candidate guidance presentation module configured to present the candidate guidance information in the third configuration area.

In some embodiments, the at least one configuration area further comprises: a fourth configuration area for receiving a selection of a model, the selected model being invoked to determine a response of the digital assistant to a user.

In some embodiments, the page further comprises: a debugging area for receiving a debugging request for the digital assistant and providing a debugging result for the debugging request, wherein the debugging result is determined based on the received debugging request and current configuration information for the digital assistant in the page.

Figure 7:
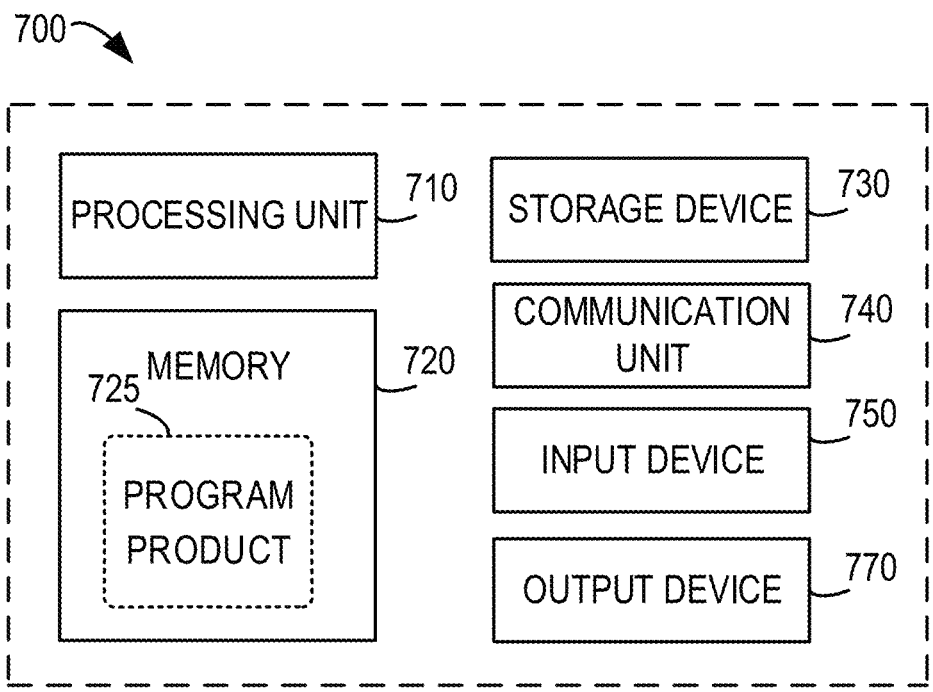
FIG. 7 shows a block diagram of an example electronic device.

FIG. 7 shows a block diagram of an example electronic device 700 in which one or more embodiments of the present disclosure may be implemented. It would be appreciated that the electronic device 700 shown in FIG. 7 is only an example and should not constitute any restriction on the function and scope of the embodiments described herein. The electronic device 700 shown in FIG. 7 may comprise or be implemented as the assistant creation platform 110 or the apparatus 600 of FIG. 6.

As shown in FIG. 7, the electronic device 700 is in the form of a general electronic device. The components of the electronic device 700 may comprise, but are not limited to, one or more processors or processing units 710, a memory 720, a storage device 730, one or more communication units 740, one or more input devices 750, and one or more output devices 760. The processing units 710 may be actual or virtual processors and can execute various processes according to the programs stored in the memory 720. In a multi-processor system, multiple processing units execute computer executable instructions in parallel to improve the parallel processing capability of the electronic device 700.

The electronic device 700 typically comprises a variety of computer storage media. Such media can be any available media that is accessible to the electronic device 700, comprising but not limited to volatile and non-volatile media, removable and non-removable media. The memory 720 can be volatile memory (such as registers, caches, random access memory (RAM)), nonvolatile memory (such as a read-only memory (ROM), an electrically erasable programmable read-only memory (EEPROM), a flash memory), or some combination thereof. The storage device 730 can be any removable or non-removable medium, and can comprise machine-readable medium, such as a flash drive, a disk, or any other medium which can be used to store information and/or data and can be accessed within the electronic device 700.

The electronic device 700 may further comprise additional removable/non-removable, volatile/non-volatile storage medium. Although not shown in FIG. 7, a disk driver for reading from or writing to a removable, non-volatile disk (such as a "floppy disk"), and an optical disk driver for reading from or writing to a removable, non-volatile optical disk can be provided. In these cases, each driver may be connected to the bus (not shown) by one or more data medium interfaces. The memory 720 can comprise a computer program product 725, which comprises one or more program modules configured to execute various methods or actions of the various embodiments disclosed herein.

The communication unit 740 implements communication with other electronic devices via a communication medium. In addition, functions of components in the electronic device 700 may be implemented by a single computing cluster or multiple computing machines, which can communicate through a communication connection. Therefore, the electronic device 700 may be operated in a networking environment using a logical connection with one or more other servers, a network personal computer (PC), or another network node.

The input device 750 may be one or more input devices, such as a mouse, a keyboard, a trackball, etc. The output device 760 may be one or more output devices, such as a display, a speaker, a printer, etc. The electronic device 700 may also communicate with one or more external devices (not shown) through the communication unit 740 as required. The external device, such as a storage device, a display device, etc., communicate with one or more devices that enable users to interact with the electronic device 700, or communicate with any device (for example, a network card, a modem, etc.) that makes the electronic device 700 communicate with one or more other computing devices. Such communication may be executed via an input/output (I/O) interface (not shown).

According to example implementation of the present disclosure, there is provided a computer-readable storage medium on which a computer-executable instruction or computer program is stored, wherein the computer-executable instructions are executed by a processor to implement the methods described above.

Various aspects of the present disclosure are described herein with reference to the flow chart and/or the block diagram of the method, the device, the apparatus, and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, special computers, or other programmable data processing devices to produce a machine that generates a device to implement the functions/acts specified in one or more blocks in the flow chart and/or the block diagram when these instructions are executed through the processing units of the computer or other programmable data processing devices. These computer-readable program instructions may also be stored in a computer-readable storage medium. These instructions enable a computer, a programmable data processing device and/or other devices to work in a specific way. Therefore, the computer-readable medium containing the instructions comprises a product, which comprises instructions operable to implement various aspects of the functions/acts specified in one or more blocks in the flowchart and/or the block diagram.

The computer-readable program instructions may be loaded onto a computer, other programmable data processing apparatus, or other devices, so that a series of operational steps can be performed on a computer, other programmable data processing apparatus, or other devices, to generate a computer-implemented process, such that the instructions which execute on a computer, other programmable data processing apparatus, or other devices are operable to implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a module, a program segment, or instructions, which includes one or more executable instructions for implementing the specified logic function. In some alternative implementations, the functions marked in the block may also occur in a different order from those marked in the drawings. For example, two consecutive blocks may actually be executed in parallel, and sometimes can also be executed in a reverse order, depending on the function involved. It should also be noted that each block in the block diagram and/or the flowchart, and combinations of blocks in the block diagram and/or the flowchart, may be implemented by a dedicated hardware-based system that performs the specified functions or acts, or by the combination of dedicated hardware and computer instructions.

Each implementation of the present disclosure has been described above. The above description provides a number of examples, not exhaustive, and is not limited to the disclosed implementations. Without departing from the scope and spirit of the described implementations, many modifications and changes are obvious to ordinary skill in the art. The selection of terms used in this article aims to best explain the principles, practical application, or improvement of technology in the market of each implementation, or to enable others of ordinary skill in the art to understand the various embodiments disclosed herein.

The invention claimed is:

1. A method for digital assistant creation, comprising:
in response to receiving a digital assistant creation request, presenting a page for creating a digital assistant, wherein the page comprises at least one configuration area for receiving configuration information for the digital assistant, and wherein the at least one configuration area comprises:
a first configuration area for receiving settings information of the digital assistant input in a natural language, wherein the settings information of the digital assistant is used to generate a prompt input of a machine learning model, and wherein a response of the digital assistant provided to a user is determined by the digital assistant based on an output of the machine learning model; and
a second configuration area for receiving a configuration of at least one processing component, wherein the configuration of the at least one processing component is provided to the machine learning model for determining the response of the digital assistant to the user;
obtaining the configuration information for the digital assistant received in the at least one configuration area of the page;
creating the digital assistant based on the configuration information for the digital assistant; and
in response to receiving a digital assistant release request, releasing the digital assistant based on the configuration information for the digital assistant, for use in interaction with the user.

2. The method of claim 1, wherein releasing the digital assistant comprises:
in response to receiving the digital assistant release request, providing at least one candidate platform, wherein the at least one candidate platform supports execution of the digital assistant; and in response to receiving a determination of a target platform amongst the at least one candidate platform, releasing the digital assistant to the target platform.

3. The method of claim 1, wherein the settings information of the digital assistant indicates at least one of:
a definition of a response style of the digital assistant;
a description of a function supported by the digital assistant;
at least one workflow to be performed by the digital assistant; or
a definition of at least one response format of the digital assistant.

4. The method of claim 1, further comprising:
providing a settings information example on the page for guiding a user in providing the settings information of the digital assistant.

5. The method of claim 1, wherein the at least one processing component comprises at least one of:
at least one plug-in configured to perform a corresponding function;
at least one workflow to be performed by the digital assistant;
at least one dataset which is to be utilized by the digital assistant to determine the response of the digital assistant to the user;
a definition of at least one type of information to be persistently stored, wherein the at least one type of information is extracted during an interaction between the digital assistant and the user and is stored for a subsequent interaction; or
a task plug-in configured to perform a predetermined task or a user-defined task.

6. The method of claim 5, further comprising:
presenting a respective response configuration control for the at least one plug-in;
in response to detecting a trigger operation of a response configuration control of a first plug-in amongst the at least one plug-in, presenting a plurality of candidate response styles associated with the first plug-in; and
receiving a selection of a target response pattern amongst the plurality of candidate response styles associated with the first plug-in.

7. The method of claim 1, wherein the at least one configuration area further comprises:
a third configuration area for receiving guidance information, wherein the guidance information is presented to a user in response to a detection of the user triggering an interaction with the digital assistant.

8. The method of claim 7, wherein the guidance information comprises at least one of: description information for the digital assistant, or at least one recommendation of a question for the digital assistant.

9. The method of claim 7, further comprising:
in response to detecting a trigger operation of an information generation control associated with the third configuration area, generating candidate guidance information based at least on the settings information of the digital assistant received in the first configuration area; and
presenting the candidate guidance information in the third configuration area.

10. The method of claim 7, wherein the at least one configuration area further comprises:

a fourth configuration area for receiving a selection of a model, wherein the selected model is invoked to determine a response of the digital assistant to a user.

11. The method of claim 1, wherein the page further comprises:
a debugging area for receiving a debugging request for the digital assistant and providing a debugging result for the debugging request,
wherein the debugging result is determined based on the received debugging request and current configuration information for the digital assistant in the page.

12. An electronic device comprising:
at least one processing unit; and
at least one memory being coupled to the at least one processing unit and storing instructions for execution by the at least one processing unit, the instructions, when executed by the at least one processing unit, cause the electronic device to perform operations comprising:
in response to receiving a digital assistant creation request, presenting a page for creating a digital assistant, wherein the page comprises at least one configuration area for receiving configuration information for the digital assistant, and wherein the at least one configuration area comprises:
a first configuration area for receiving settings information of the digital assistant input in a natural language, wherein the settings information of the digital assistant is used to generate a prompt input of a machine learning model, and wherein a response of the digital assistant provided to a user is determined by the digital assistant based on an output of the machine learning model; and
a second configuration area for receiving a configuration of at least one processing component, wherein the configuration of the at least one processing component is provided to the machine learning model for determining the response of the digital assistant to the user;
obtaining the configuration information for the digital assistant received in the at least one configuration area of the page;
creating the digital assistant based on the configuration information for the digital assistant; and
in response to receiving a digital assistant release request, releasing the digital assistant based on the configuration information for the digital assistant, for use in interaction with the user.

13. The electronic device of claim 12, wherein releasing the digital assistant comprises:
in response to receiving the digital assistant release request, providing at least one candidate platform, wherein the at least one candidate platform supports execution of the digital assistant; and
in response to receiving a determination of a target platform amongst the at least one candidate platform, releasing the digital assistant to the target platform.

14. The electronic device of claim 12, wherein the settings information of the digital assistant indicates at least one of:
a definition of a response style of the digital assistant;
a description of a function supported by the digital assistant;
at least one workflow to be performed by the digital assistant; or
a definition of at least one response format of the digital assistant.

15. The electronic device of claim 12, wherein the operations further comprise:
providing a settings information example on the page for guiding a user in providing the settings information of the digital assistant.

16. The electronic device of claim 12, wherein the at least one processing component comprises at least one of:
at least one plug-in configured to perform a corresponding function;
at least one workflow to be performed by the digital assistant;
at least one dataset which is to be utilized by the digital assistant to determine the response of the digital assistant to the user;
a definition of at least one type of information to be persistently stored, wherein the at least one type of information is extracted during an interaction between the digital assistant and the user and is stored for a subsequent interaction; or
a task plug-in configured to perform a predetermined task or a user-defined task; and
wherein the operations further comprise:
presenting a respective response configuration control for the at least one plug-in;
in response to detecting a trigger operation of a response configuration control of a first plug-in amongst the at least one plug-in, presenting a plurality of candidate response styles associated with the first plug-in; and
receiving a selection of a target response pattern amongst the plurality of candidate response styles associated with the first plug-in.

17. The electronic device of claim 12, wherein the at least one configuration area further comprises:
a third configuration area for receiving guidance information, wherein the guidance information is presented to a user in response to a detection of the user triggering an interaction with the digital assistant; and
wherein the guidance information comprises at least one of: description information for the digital assistant, or at least one recommendation of a question for the digital assistant.

18. A non-transitory computer-readable storage medium having a computer program stored thereon, the computer program being executable by a processor to perform operations comprising:
in response to receiving a digital assistant creation request, presenting a page for creating a digital assistant, wherein the page comprises at least one configuration area for receiving configuration information for the digital assistant, and wherein the at least one configuration area comprises:
a first configuration area for receiving settings information of the digital assistant input in a natural language, wherein the settings information of the digital assistant is used to generate a prompt input of a machine learning model, and wherein a response of the digital assistant provided to a user is determined by the digital assistant based on an output of the machine learning model; and
a second configuration area for receiving a configuration of at least one processing component, wherein the configuration of the at least one processing component is provided to the machine learning model for determining the response of the digital assistant to the user;
obtaining the configuration information for the digital assistant received in the at least one configuration area of the page;
creating the digital assistant based on the configuration information for the digital assistant; and
in response to receiving a digital assistant release request, releasing the digital assistant based on the configuration information for the digital assistant, for use in interaction with the user.

* * * * *